(12) United States Patent
Doi et al.

(10) Patent No.: US 8,303,457 B2
(45) Date of Patent: Nov. 6, 2012

(54) AUTOMATIC TRANSMISSION

(75) Inventors: Junichi Doi, Hiroshima (JP); Shinya Kamada, Kure (JP); Takamichi Teraoka, Hiroshima (JP); Tokimori Saka, Hiroshima (JP); Tatsuhiko Iwasaki, Kure (JP); Naohiro Sakaue, Hiroshima (JP); Tatsutoshi Mizobe, Hiroshima (JP); Hideo Toyota, Aki-gun (JP); Kensuke Ueda, Aki-gun (JP); Norio Iwashita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 532 days.

(21) Appl. No.: 12/155,264

(22) Filed: May 30, 2008

(65) Prior Publication Data

US 2008/0300095 A1 Dec. 4, 2008

(30) Foreign Application Priority Data

May 30, 2007 (JP) .................................. 2007-143058

(51) Int. Cl.
*F16H 3/44* (2006.01)
*F16H 57/04* (2010.01)

(52) U.S. Cl. .................. 475/286; 475/159; 475/290

(58) Field of Classification Search .................. 475/159, 475/269, 271, 296, 330, 275–290; 192/3.33, 192/221, 48.1, 48.619
See application file for complete search history.

(56) References Cited

U.S. PATENT DOCUMENTS

| | | | |
|---|---|---|---|
| 4,070,927 A | 1/1978 | Polak | |
| 5,230,664 A * | 7/1993 | Michioka et al. | 474/43 |
| 5,597,370 A * | 1/1997 | Nogle | 475/159 |
| 5,755,636 A | 5/1998 | Justice et al. | |
| 6,176,802 B1 | 1/2001 | Kasuya et al. | |
| 6,572,507 B1 * | 6/2003 | Korkmaz et al. | 475/276 |
| 6,997,845 B2 * | 2/2006 | Tiesler et al. | 475/278 |
| 2005/0026740 A1 | 2/2005 | Tiesler et al. | |
| 2005/0067251 A1 * | 3/2005 | Braford et al. | 192/70.12 |
| 2005/0143214 A1 | 6/2005 | Shim | |
| 2006/0046891 A1 | 3/2006 | Park | |
| 2006/0135309 A1 | 6/2006 | Shim et al. | |
| 2007/0293363 A1 * | 12/2007 | Bauknecht et al. | 475/276 |

FOREIGN PATENT DOCUMENTS

EP 1 398 536 A2 3/2004

OTHER PUBLICATIONS

European Office Action dated Jan. 21, 2010 issued in corresponding European Patent Application 08 157 171.3.
European Search Report issued on May 8, 2009 in corresponding European Patent Application 08157171.3.

* cited by examiner

*Primary Examiner* — Roger Pang

(57) ABSTRACT

An automatic transmission has first, second and third gear sets, first and second clutches, and first, second and third brakes. First, second and third sun gears, and a first carrier are interconnected with a second sun gear, a second carrier, a third carrier, an input shaft and an output gear, respectively. The first clutch selectively connects the first sun gear and the second sun gear to the input shaft, and the second clutch selectively connects the first ring gear and the second carrier to the input shaft. The first brake selectively connects the first ring gear and the second carrier to a casing. The second brake selectively connects the second ring gear and the third carrier to the casing, and the third brake selectively connects the third ring gear to the casing.

9 Claims, 8 Drawing Sheets

FIG. 2

|  | 1ST CLUTCH (40) | 2ND CLUTCH (50) | 1ST BRAKE (60) | 2ND BRAKE (70) | 3RD BRAKE (80) |
|---|---|---|---|---|---|
| 1ST SPEED | ○ |  |  |  |  |
| 2ND SPEED | ○ |  | (○) |  |  |
| 3RD SPEED | ○ |  |  | ○ |  |
| 4TH SPEED | ○ | ○ |  |  |  |
| 5TH SPEED |  | ○ |  |  | ○ |
| 6TH SPEED |  | ○ |  | ○ |  |
| REVERSE SPEED |  |  | ○ |  | ○ |

AUTOMATIC TRANSMISSION

BACKGROUND OF THE INVENTION

1. Field of the Invention

The present invention relates to an automatic transmission mountable on a vehicle, and particularly to a structure of a speed change mechanism thereof, and belongs to a technical field of vehicle transmissions.

2. Description of the Related Art

An automatic transmission mountable on a vehicle, such as an automobile, is designed such that a power transmission path in a speed change mechanism adapted to receive as an input an engine output rotation through a torque converter is changed based on selective engagement of a plurality of friction elements to establish a plurality of speed stages different in speed reduction ratio. Recent years, with a view to improvements in driving performance, fuel economy performance and others for vehicles, the number of speed stages has tended to be increased. For example, U.S. Pat. No. 6,176,802 B1 (hereinafter referred to as "Patent Document 1") and U.S. Patent Publication No. 2006/0135309 A1 (hereinafter referred to as "Patent Document 2") disclose an automatic transmission intended to establish six forward speed stages.

Specifically, an automatic transmission disclosed in the Patent Document 1 comprises a speed change mechanism which is made up using one single-pinion type planetary gear set and one Ravigneaux type planetary gear set, and an automatic transmission disclosed in the Patent Document 2 comprises a speed change mechanism which is made up using two single-pinion type planetary gear sets and one double-pinion type planetary gear set. Each of these speed change mechanisms is provided with five friction elements, and adapted to establish six forward speed stages and a reverse speed stage based on selective engagement of the five friction elements.

The Ravigneaux type planetary gear set used in the automatic transmission disclosed in the Patent Document 1 has problems about a relatively high cost and a risk of causing gear noise, because of its structural complexity as compared with a single-pinion type planetary gear set, due to the requirement to have two sun gears different in diameter, and two types of pinions.

The double-pinion type planetary gear set used in the automatic transmission disclosed in the Patent Document 2 also has problems about a relatively high cost and an increase in diameter, because of its structural complexity due to the requirement to have two types of pinions. Moreover, in both the above planetary gear sets, the number of gears is inevitably increased to cause an increase in power loss, as compared with a single-pinion type planetary gear set.

SUMMARY OF THE INVENTION

In view of the above circumstances, it is an object of the present invention to provide an automatic transmission capable of establishing six forward speed stages, using only a single-pinion type planetary gear set having a simple structure.

In order to achieve this object, the present invention provides an automatic transmission which comprises: a casing housing following components; an input shaft; an output member arranged on a same axis as that of the input shaft and at an intermediate position of the input shaft; first, second and third gear sets each formed as a single-pinion type planetary gear set including a sun gear, a pinion, a carrier and a ring gear, wherein the sun gear of the first gear set is continuously interconnected with the sun gear of the second gear set, the ring gear of the first gear set being continuously interconnected with the carrier of the second gear set, the ring gear of the second gear set being continuously interconnected with the carrier of the third gear set, the sun gear of the third gear set being continuously interconnected with the input shaft, and the carrier of the first gear set being continuously interconnected with the output member; a first clutch operable to selectively connect and disconnect the sun gear of the first gear set and the sun gear of the second gear set to/from the input shaft; a second clutch operable to selectively connect and disconnect the ring gear of the first gear set and the carrier of the second gear set to/from the input shaft; a first brake operable to selectively connect and disconnect the ring gear of the first gear set and the carrier of the second gear set to/from the casing; a second brake operable to selectively connect and disconnect the ring gear of the second gear set and the carrier of the third gear set to/from the casing; and a third brake operable to selectively connect and disconnect the ring gear of the third gear set to/from the casing. In the automatic transmission, the first clutch and the first brake are adapted to be placed in their engaged states so as to establish a first speed stage, and the first clutch and the second brake are adapted to be placed in their engaged states so as to establish a second speed stage. The first clutch and the third brake are adapted to be placed in their engaged states so as to establish a third speed stage, and the first clutch and the second clutch are adapted to be placed in their engaged states so as to establish a fourth speed stage. Further, the second clutch and the third brake are adapted to be placed in their engaged states so as to establish a fifth speed stage, and the second clutch and the second brake are adapted to be placed in their engaged states so as to establish a sixth speed stage.

In the above automatic transmission of the present invention, a forward 6-speed automatic transmission can be made up using only a single-pinion type planetary gear having a simple structure. This makes it possible to achieve an automatic transmission excellent in power transmission efficiency and silence, while facilitating reductions in overall size and cost of the automatic transmission, as compared with a conventional automatic transmission using a Ravigneaux type planetary gear set or a double-pinion type planetary gear set.

These and other objects, features and advantages of the invention will become apparent upon reading the following detailed description along with the accompanying drawings.

BRIEF DESCRIPTION OF THE DRAWINGS

FIG. 2 is a table showing a relationship between a combination of engaged states of a plurality of friction elements.

DESCRIPTION OF THE PREFERRED EMBODIMENTS

The present invention will now be described based on an embodiment thereof.

Figure 1:
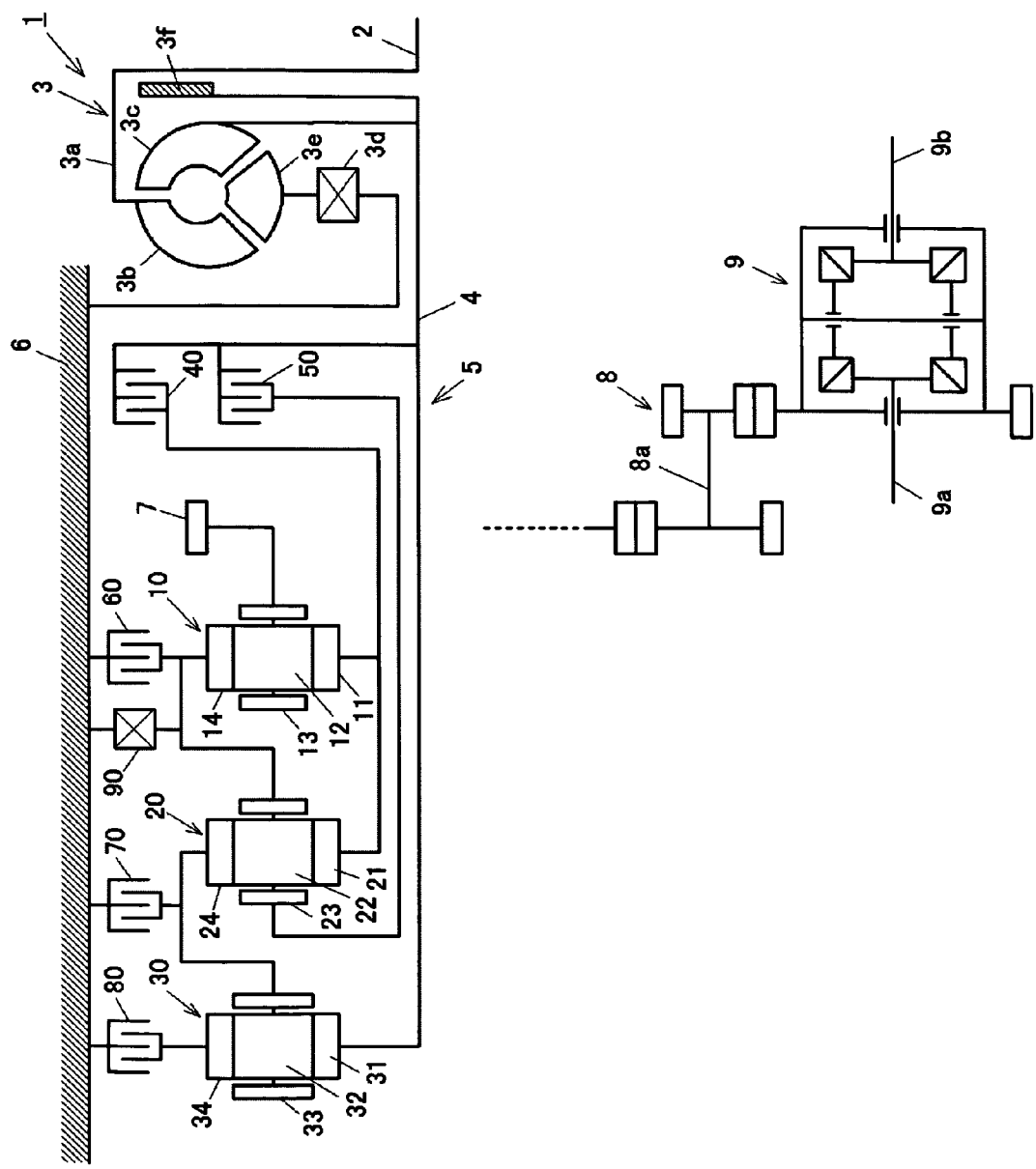
FIG. 1 is a skeletal diagram of an automatic transmission according to one embodiment of the present invention.

FIG. 1 is a skeletal diagram of an automatic transmission according to one embodiment of the present invention. This automatic transmission 1 is designed for a transverse engine-mounted vehicle, such as a front-engine front-drive vehicle. As a primary component, the automatic transmission 1 comprises a torque converter 3 attached to an engine output shaft 2, and a speed change mechanism 5 adapted to receive as an input an output rotation of the torque converter 3 through an input shaft 4. The speed change mechanism 5 is housed in a transmission casing 6 while being disposed on an axis of the input shaft 4.

An output rotation of the speed change mechanism 5 is transmitted from an output gear 7 disposed on the same axis as that of the input shaft 4 and at an intermediate position of the input shaft 4, to a differential mechanism 8 through a counter drive mechanism 8, so as to drive right and left axles 9a, 9b.

The torque converter 3 comprises a torque converter casing 3a continuously interconnected with the engine output shaft, a pump 3b arranged inside the torque converter casing 3a and fixed to the torque converter casing 3a, a turbine 3c disposed in opposed relation to the pump 3b and adapted to be driven by the pump 3b through working oil, a stator 3e interposed between the pump 3b and the turbine 3c while being supported by the transmission casing 6 through a one-way clutch 3d, and adapted to act as torque amplifying means, and a lock-up clutch 3f disposed between the torque converter casing 3a and the turbine 3c, and adapted to directly connect the engine output shaft 2 and the turbine 3c through the torque converter casing 3a. A rotation of the turbine 3c is transmitted to the speed change mechanism 5 through the input shaft 4.

The speed change mechanism 5 comprises first, second and third planetary gear sets (hereinafter referred to simply as "first, second and third gear sets") 10, 20, 30. On a far side opposite to a near side closer to the torque converter 3, relative to the output gear 7, the first, second and third gear sets 10, 20, 30 are disposed side by side in this order from the side of the torque converter 3.

As a friction element constituting the speed change mechanism 5, a first clutch 40 and a second clutch 50 are disposed on the near side relative to the output gear 7, and a first brake 60, a second brake 70 and a third brake 80 are disposed on the far side relative to the output gear 7 in this order from the side of the torque converter 3. Further, a one-way clutch 90 is disposed in parallel to the first brake 60.

Each of the first, second and third gear sets 10, 20, 30 is formed as a single-pinion type planetary gear set which comprises a sun gear (11, 21, 31), a pinion (12, 22, 32) including a plurality of pinion elements meshed with the sun gear (11, 21, 31), a carrier (13, 23, 33) supporting the pinion (12, 22, 32), and a ring gear (14, 24, 34) meshed with the pinion (12, 22, 32).

The input shaft 4 is continuously interconnected with the sun gear 31 of the third gear set 30, and the sun gear 11 of the first gear set 10 is continuously interconnected with the sun gear 21 of the second gear set 20. The ring gear 14 of the first gear set 10 is continuously interconnected with the carrier 23 of the second gear set 20, and the ring gear 24 of the second gear set 20 is continuously interconnected with the carrier 33 of the third gear set 30. Further, the carrier 13 of the first gear set 10 is continuously interconnected with the output gear 7.

The sun gear 11 of the first gear set 10 and the sun gear 21 of the second gear 20 are coupled to the input shaft 4 through the first clutch 40 in a selectively connectable/disconnectable manner, and the carrier 23 of the second gear 20 is coupled to the input shaft 4 through the second clutch 50 in a selectively connectable/disconnectable manner.

The ring gear 14 of the first gear set 10 and the carrier 23 of the second gear 20 are coupled to the transmission casing 6 through the first brake 60 and the one-way clutch 90 disposed in parallel to each other, in a selectively connectable/disconnectable manner, and the ring gear 24 of the second gear set 20 and the carrier 33 of the third gear set 30 are coupled to the transmission casing 6 through the second brake 70 in a selectively connectable/disconnectable manner. Further, the ring gear 34 of the third gear set 30 is coupled to the transmission casing 6 through the third brake 80 in a selectively connectable/disconnectable manner.

Based on the above structure, the speed change mechanism 5 can establish six forward speed stages and a reverse speed stage according to various combinations of engaged states of the first and second clutches 40, 50, and the first, second and third brakes 60, 70, 80. FIG. 2 is an engagement table showing a relationship between respective ones of the combinations and the speed stages. In FIG. 2, the first brake 60 is placed in an engaged state only during a period of a first speed stage where an engine brake function is activated. During a period of the first speed stage where the engine brake function is not activated, the one-way clutch 90 is locked to allow the first speed stage to be established.

A power transmission state of the speed change mechanism 5 in each of the speed stages will be described below.

Figure 3:
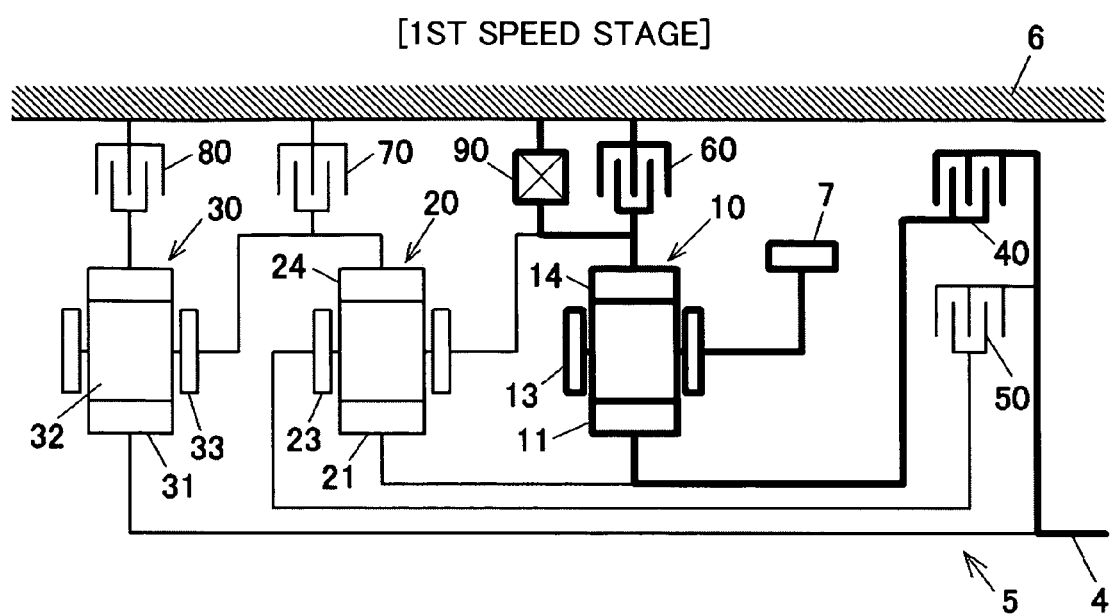
FIG. 3 is a fragmentary skeletal diagram showing a state of the automatic transmission in a first speed stage.

As shown in FIG. 3, in the first speed stage, the first clutch 40 is placed in an engaged state, and the one-way clutch 90 is in a locked state. During the period of the first speed stage where the engine brake is activated, the first brake 60 is also placed in the engaged state.

In the first speed stage, a rotation of the input shaft 4 (hereinafter referred to as "input rotation") is input into the sun gear 11 of the first gear set 10, and the ring gear 14 of the first gear set 10 is fixed to the transmission casing 6 through the first brake 60 or the one-way clutch 90. Thus, the input rotation is reduced in speed, and then output from the carrier 13 to the output gear 7. In this manner, a first speed state having a large speed reduction ratio can be established.

Figure 4:
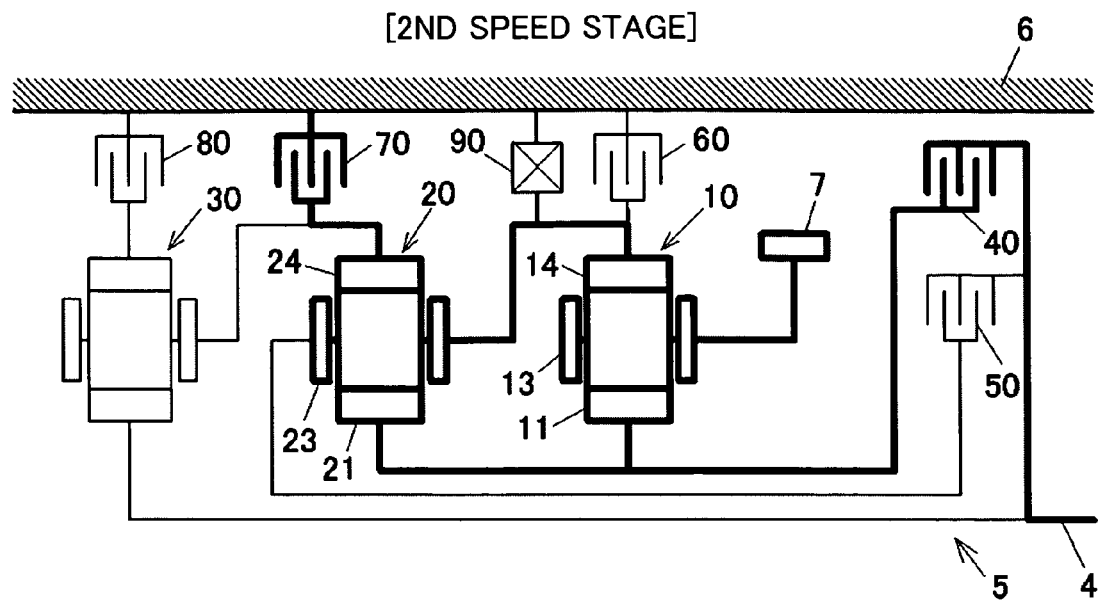
FIG. 4 is a fragmentary skeletal diagram showing a state of the automatic transmission in a second speed stage.

As shown in FIG. 4, in a second speed stage, the first clutch 40 and the second brake 70 are placed in their engaged states, and thereby an input rotation is input into the sun gear 11 of the first gear set 10 and the sun gear 21 of the second gear set 20 through the first clutch 40. In the second speed stage, the ring gear 24 of the second gear set 20 is fixed by the second brake 70, and therefore the input rotation input into the sun gear 21 is reduced in speed, and then output from the carrier 23 to the ring gear 14 of the first gear set 10. Thus, the input rotation input into the sun gear 11 of the first gear set 10 is output to the carrier 13 and the output gear 7 at a speed reduction ratio less than that in the first speed stage where the ring gear 14 is fixed. In this manner, a second speed stage having a speed reduction ratio less than that in the first speed stage can be established.

Figure 5:
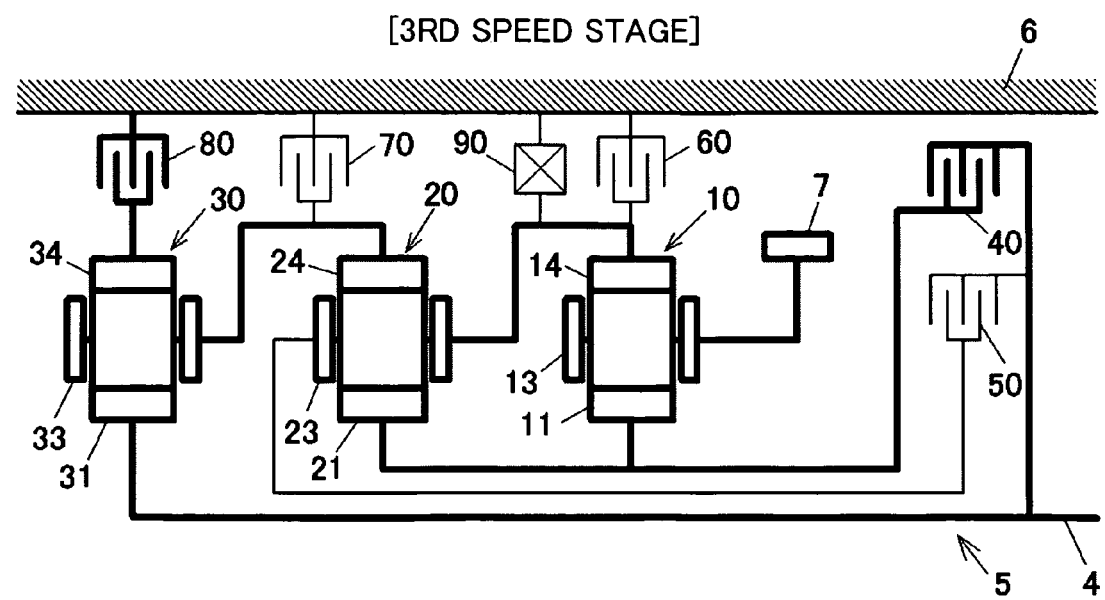
FIG. 5 is a fragmentary skeletal diagram showing a state of the automatic transmission in a third speed stage.

As shown in FIG. 5, in a third speed stage, the first clutch 40 and the third brake 80 are placed in their engaged states. Thus, an input rotation is input into the sun gear 11 of the first gear set 10 and the sun gear 21 of the second gear set 20 through the first clutch 40, and further input directly to the sun gear 31 of the third gear set 30.

In the third speed stage, the ring gear 34 of the third gear set 30 is fixed by the third brake 80, and therefore the input rotation input into the sun gear 31 is reduced in speed, and then output from the carrier 33 to the ring gear 24 of the second gear set 20. Thus, the input rotation input into the sun gear 21 of the second gear set 20 is output from the carrier 23 at a speed reduction ratio less than that in the second speed stage where the ring gear 24 is fixed, and this rotation is input into the ring gear 14 of the first gear set 10.

Consequently, a rotation of the ring gear 14 of the first gear set 10 is increased up to a speed greater than that in the second speed stage. Therefore, when the input rotation input into the sun gear 11 is reduced in speed, and then output from the carrier 13, a resulting rotation will be increased up to a speed greater than that in the second speed stage. In this manner, a third speed stage having a speed reduction ratio less than that in the second speed stage can be established.

Figure 6:
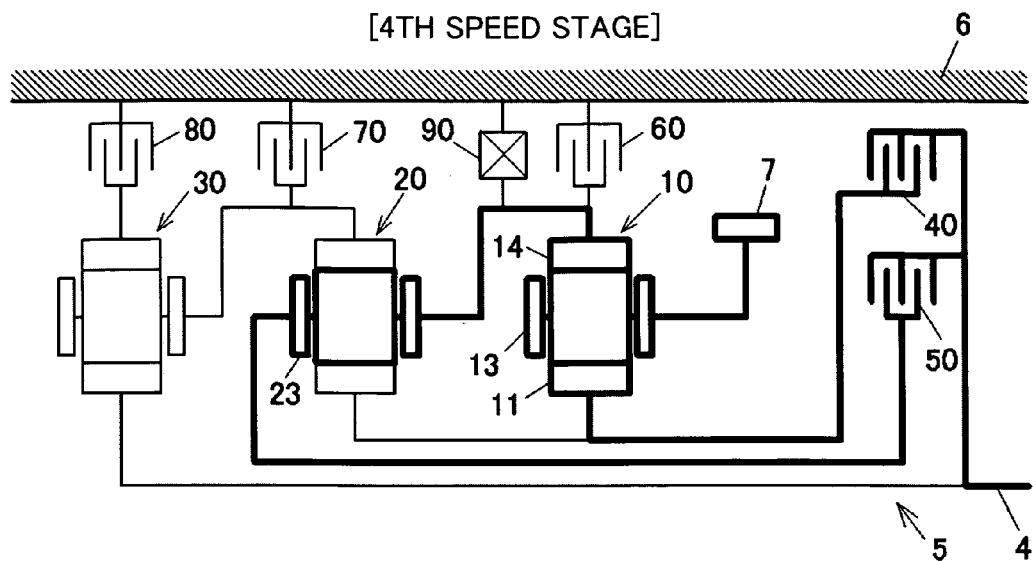
FIG. 6 is a fragmentary skeletal diagram showing a state of the automatic transmission in a fourth speed stage.

As shown in FIG. 6, in a fourth speed stage, the first clutch 40 and the second clutch 50 are placed in their engaged states. Thus, an input rotation is input into the sun gear 11 of the first gear set 10 through the first clutch 40, and simultaneously input into the carrier 23 of the second gear set 20 through the second clutch 50. The carrier 23 of the second gear set 20 is continuously interconnected with the ring gear 14 of the first gear set 10, and therefore the input rotation is also input into the ring gear 14 of the first gear set 10.

Thus, the first gear set 10 is integrally rotated together with the input shaft 4 in its entirety, and a rotation having the same speed as that of the input rotation is output from the ring gear 14 to the output gear 7. In this manner, a fourth speed stage having a speed reduction ratio of 1 can be established.

Figure 7:
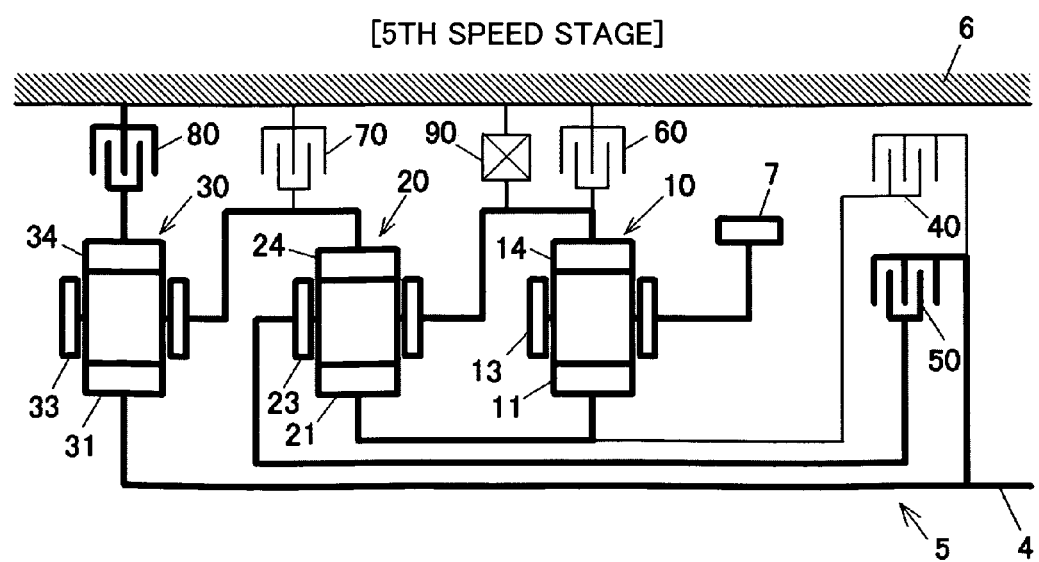
FIG. 7 is a fragmentary skeletal diagram showing a state of the automatic transmission in a fifth speed stage.

As shown in FIG. 7, in a fifth speed stage, the second clutch 50 and the third brake 80 are placed in their engaged states. Thus, an input rotation is input into the carrier 23 of the second gear set 20 through the second clutch 50, and simultaneously input directly into the sun gear 31 of the third gear set 30.

In the fifth speed stage, the ring gear 34 of the third gear set 30 is fixed by the third brake 80, and therefore the input rotation input into the sun gear 31 is reduced in speed, and then output from the carrier 33 to the ring gear 24 of the second gear set 20. Thus, in the second gear set 20, the input rotation input into the carrier 23 is increased in speed, and then output from the sun gear 21. This rotation is input into the sun gear 11 of the first gear set 10.

Consequently, in the first gear set 10, the input rotation is input into the ring gear 14 through the carrier 23 of the second gear set 20, and simultaneously the rotation having the increased speed greater than that of the input speed is input into the sun gear 11. Thus, a rotation having an increased speed greater than that of the input rotation is output from the carrier 13 to the output gear 7. In this manner, a fifth speed stage having a speed reduction ratio of less than 1 can be established.

Figure 8:
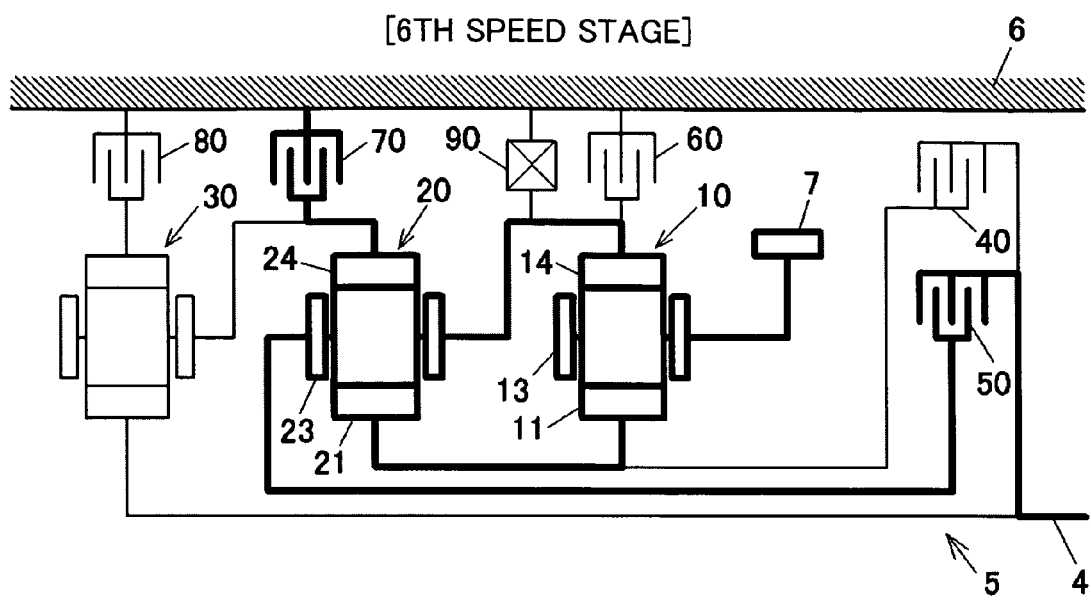
FIG. 8 is a fragmentary skeletal diagram showing a state of the automatic transmission in a sixth speed stage.

As shown in FIG. 8, in a sixth speed stage, the second clutch 50 and the second brake 80 are placed in their engaged states. Thus, an input rotation is input into the carrier 23 of the second gear set 20 through the second clutch 50. In the sixth speed stage, the ring gear 24 of the second gear set 20 is fixed by the second brake 70, and therefore the input rotation input into the carrier 23 is increased in speed, and then output from the sun gear 21 to the sun gear 11 of the first gear set 10.

Thus, in the first gear set 10, the input rotation input into the ring gear 14 through the carrier 23 of the second gear set 20, and simultaneously the rotation having is increased in speed, and then output from the sun gear 21. This rotation is input into the sun gear 11 of the first gear set 10.

Consequently, in the first gear set 10, the input rotation is input into the ring gear 14 through the carrier 23 of the second gear set 20, and simultaneously the rotation having the increased speed greater than that of the input rotation is input into the sun gear 11. In this case, the rotation input into the sun gear 11 is increased up to a speed greater than that in the fifth speed stage, and therefore a rotation to be output from the carrier 13 will also be increased up to a speed greater than that in the fifth speed stage. In this manner, a sixth speed stage having a speed reduction ratio less than that in the fifth speed stage can be established.

Figure 9:
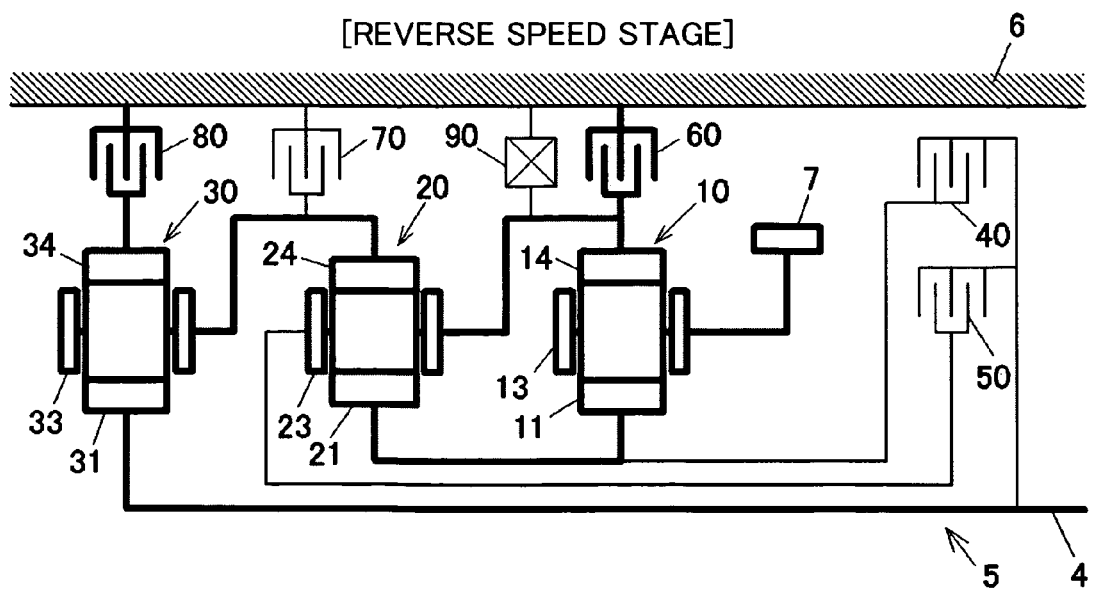
FIG. 9 is a fragmentary skeletal diagram showing a state of the automatic transmission in a reverse speed stage.

As shown in FIG. 9, in a reverse speed stage, the first brake 60 and the third brake 80 are placed in their engaged states. Thus, an input rotation is directly input into the sun gear 31 of the third gear set 30. The ring gear 34 of the third gear set 30 is fixed by the third brake 80, and therefore the input rotation input into the sun gear 31 is reduced in speed, and then output from the carrier 33 to the ring gear 24 of the second gear set 20.

In the reverse speed stage, the carrier 23 of the second gear set 20 is fixed by the first brake 60, and therefore the input rotation input into the ring gear 24 is reversed in direction, and then output from the sun gear 21. This rotation is input into the sun gear 11 of the first gear set 10.

Thus, in the first gear set 10, the reverse rotation is input into the sun gear 11 under a condition that the ring gear 14 is fixed by the first brake 60. Consequently, the reverse rotation is further reduced in speed, and then output from the carrier 13 to the output gear 7. In this manner, a reverse speed stage having a large speed reduction ratio can be established.

As above, in the automatic transmission according to this embodiment, the speed change mechanism 5 is made up using the three single-pinion type planetary gear sets 10, 20, 30 having a simple structure, and low driving loss and noise. This makes it possible to achieve a compact automatic transmission excellent in power transmission efficiency and silence, and capable of adequately setting a speed reduction ratio in each speed stage for a forward 6-speed automatic transmission.

In the above speed change mechanism 5, the output gear 7 is disposed at an intermediate position of the input shaft 4 on a near side closer to the torque converter 3, relative to the first, second and third gear sets 10, 20, 30, so that the output gear 7 is located adjacent to the torque converter 3. Thus, as shown in FIG. 1, the differential mechanism 9 and the output gear 7 disposed in a vicinity of the torque converter 3 axially come close to each other to allow a length of a counter drive shaft 8a constituting the counter drive mechanism 8 to be reduced.

This makes it possible to structurally simplify a power unit to be formed by integrally coupling the automatic transmission 1 and the differential mechanism 9 together through the counter drive mechanism, so as to provide enhanced layout flexibility during vehicle installation thereof.

A specific structure of the speed change mechanism 5 in the automatic transmission according to this embodiment will be described below.

Figure 10:
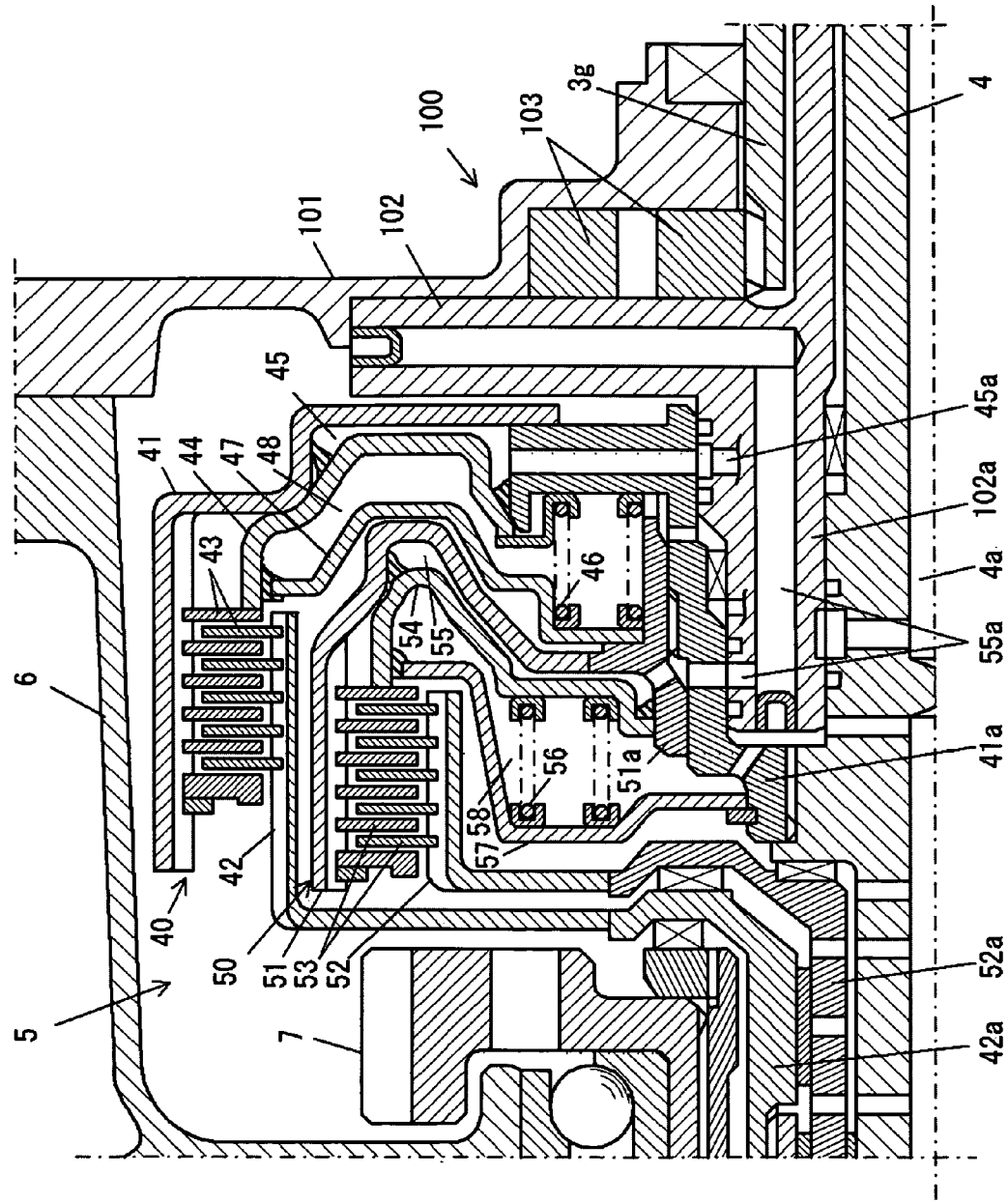
FIG. 10 is a sectional view showing the structure of a portion of a speed change mechanism on a side of a torque converter, relative to an output gear.

FIG. 10 shows the structure of a portion of the speed change mechanism 5 on the near side relative to the output gear 5, wherein an oil pump 100 is attached to an opening at a front end of the transmission casing 6, and the first and second clutches 40, 50 are disposed between the oil pump 100 and the output gear 7. This oil pump 100 additionally serves as a casing defining a receiving space for the speed change mechanism 5 in cooperation with the transmission casing 6.

The first clutch 40 comprises a drum 41, and a hub 42 disposed on a radially inward side relative to the drum 42. The drum 41 is connected to the input shaft 4 through an extension member 41*a* joined to an inner peripheral portion of the drum 41. The hub 42 is connected to the respective sun gears 11, 21 of the first and second gear sets 10, 20 through an extension member 42*a* joined to an inner peripheral portion of the hub 42 (see FIG. 11).

The first clutch 40 further includes: a plurality of friction plates 43, - - - , 43 which are arranged between the drum 41 and the hub 42, in such a manner as to be alternately engaged with the drum 41 and the hub 42; a piston 44 adapted to allow the friction plates 43, - - - , 43 to be placed in an engaged state; an oil pressure chamber 45 adapted to move the piston 44 in an engagement direction in response to supply of working oil thereto; and a return spring 46 biasing the piston 44 in a disengagement direction. Further, on an opposite side of the oil pressure chamber 45 with respect to the piston 44, a balance chamber 48 is defined by a seal plate 47 to suppress drag of the friction plates 43, - - - , 43 due to residual working fluid in the oil pressure chamber 45 in a disengaged state thereof.

The second clutch 50 comprises a drum 51 disposed on a radially inward side relative to the hub 42 of the first clutch 40, and a hub 52 disposed on a radially inward side of the drum 51. The drum 51 is connected to the input shaft 4 through an extension member 51*a* joined to an inner peripheral portion of the drum 51 and the extension member 41*a* of the drum 41 of the first clutch 40. The hub 52 is connected to the carrier 23 of the second gear set 20 through an extension member 52*a* joined to an inner peripheral portion of the hub 52 (see FIG. 11).

The second clutch 50 further includes: a plurality of friction plates 53, - - - , 53 which are arranged between the drum 51 and the hub 52, in such a manner as to be alternately engaged with the drum 51 and the hub 52; a piston 54 adapted to allow the friction plates 53, - - - , 53 to be placed in an engaged state; an oil pressure chamber 55 adapted to move the piston 54 in an engagement direction; and a return spring 56 biasing the piston 54 in a disengagement direction, in the same manner as that in the first clutch 40. Further, a balance chamber 58 is defined by a seal plate 57.

The oil pump 100 is formed to receive a pair of pump gears 103, 103 in a space defined between a pump housing 101 and an oil pump cover 102, and adapted to drive the gears 103, 103 by a sleeve 3*g* provided in the torque converter casing 3*a* of the torque converter 3, so as to generate an oil pressure.

A boss portion 102*a* is provided in a central region of the oil pump cover 102 to extend toward a far side opposite to a near side closer to the torque converter 3, relative to the first and second clutches 40, 50. The extension portions 41*a*, 52*a* of the drums 41, 51 of the first and second clutches 40, 50 are rotatably supported by the boss portion 102*a*, and two oil passages 45*a*, 55*a* are provided in the boss portion 102*a* of the oil pump cover 102 to supply working oil to the oil pressure chambers 45, 55 of the first and second clutches 40, 50, respectively. The respective balance chambers 48, 58 of the first and second clutches 40, 50 are supplied with working oil from a lubricating oil passage 4*a* provided in the input shaft 4.

In the above structure, the first and second clutches 40, 50 are disposed on the near side relative to the output gear 7, and the drum 51 of the second clutch 50 is disposed on the radially inward side relative to the hub 42 of the first clutch 40, as described above. That is, the first and second clutches 40, 50 are disposed at radially inward and outward positions in a superimposed manner, while overlapping in an axial direction of the input shaft 4. Thus, as compared with an arrangement where they are disposed side by side in the axial direction, an axial size of the speed change mechanism 5 or the entire automatic transmission can be reduced.

Figure 11:
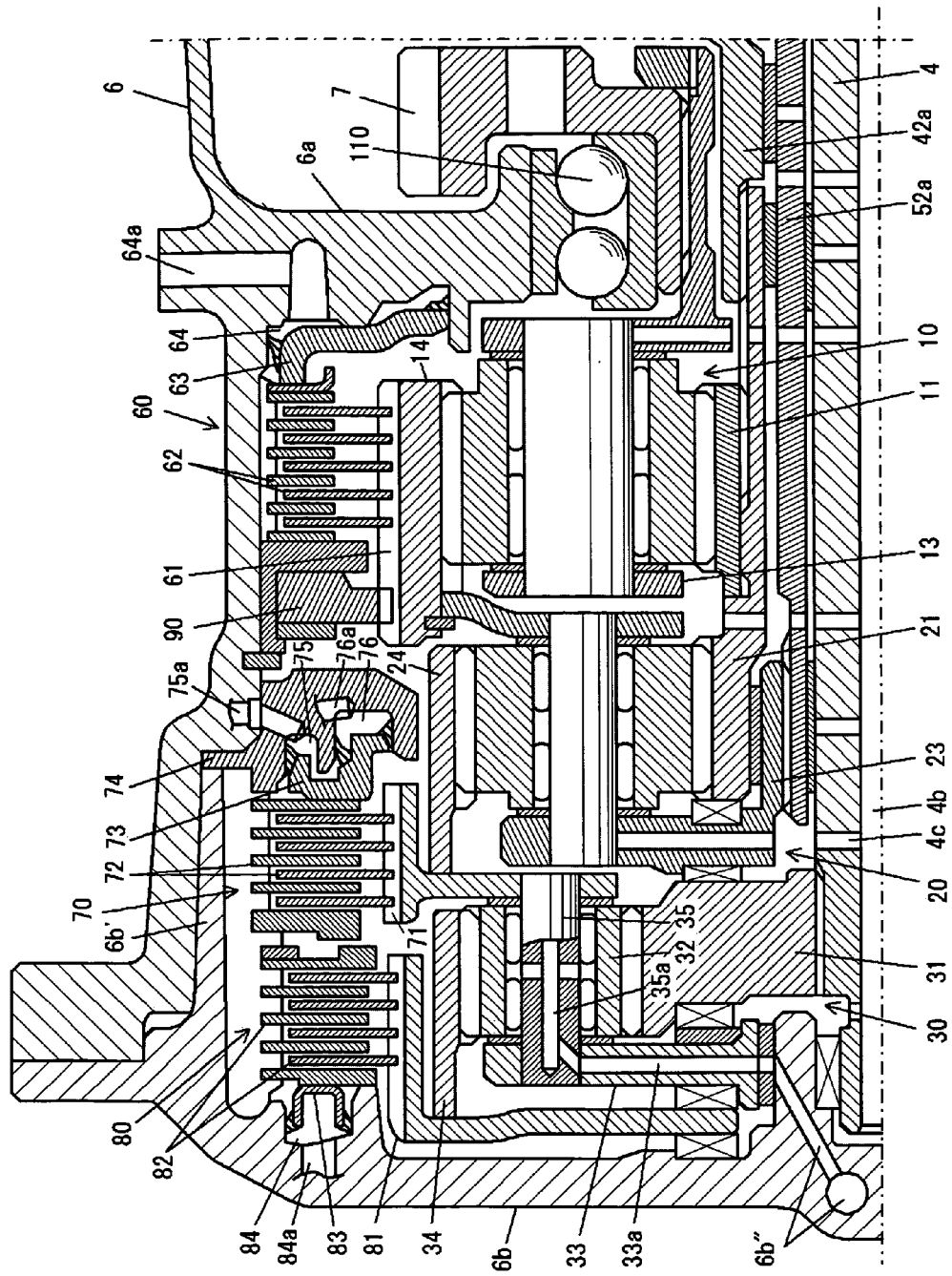
FIG. 11 a sectional view showing the structure of a portion of the speed change mechanism on a side opposite to the side of the torque converter, relative to the output gear.

With reference to FIG. 11, the structure of a portion of the speed change mechanism 5 on the far side opposite to the near side, relative to the output gear 7 will be described below. The transmission casing 6 is provided with an intermediate wall 6*a* supporting the output gear 7 through a bearing 110, and an end cover 6*b* serving as a casing defining the receiving space for the speed change mechanism 5. The end cover 6*b* has a cylindrical portion 6*b*' which is fitted into an opening at a far-side end of the transmission casing 6 to close the opening of the transmission casing 6.

The first, second and third gear sets 10, 20, 30 are disposed between the intermediate wall 6*a* and the end cover 6*b* side by side in this order. The sun gears of the first and second gear sets 10, 20 are connected to the extension member 42*a* of the hub 42 of the first clutch 40, and the carrier 23 of the second gear set 20 is connected to the extension member 52*a* of the hub 52 of the second clutch 50, as described above.

The sun gear 31 of the third gear set 30 is continuously interconnected with the input shaft 4, and the carrier 13 of the first gear set 10 is continuously interconnected with the output gear 7. The ring gear 14 of the first gear set 10 is continuously interconnected with the carrier 23 of the second gear set 20, and the ring gear 24 of the second gear set 20 is continuously interconnected with the carrier 33 of the third gear set 30.

The first brake 60, the second brake 70 and the third brake 80 are disposed on a radially outward side relative to the first, second and third gear sets 10, 20, 30, in this order from the side of the intermediate wall 6*a*.

Among them, the first brake 60 comprises: a hub 61 integrally formed with the ring gear 14 of the first gear set 10; a plurality of friction plates 62, - - - , 62 disposed between the hub 61 and an inner peripheral surface of the transmission casing 6 in such a manner as to be alternately engaged with the hub 61 and the transmission casing 6; a piston 63 adapted to allow the friction plates 62, - - - , 62 to be placed in an engaged state; and an oil pressure chamber 64 adapted to move the piston 63 in an engagement direction in response to supply of working oil thereto. The transmission casing 6 is provided with an oil passage 64*a* for supplying working oil to the oil pressure chamber 64. Further, the one-way clutch 90 disposed in parallel to the first brake 60 is arranged between the hub 61 and the inner peripheral surface of the transmission casing 6.

The second brake 70 comprises: a hub 71 integrally formed with the ring gear 24 of the second gear set 20 and the carrier 33 of the third gear set 30; a plurality of friction plates 72, - - - , 72 disposed between the hub 71 and an inner peripheral surface of the cylindrical portion 6*b*' of the end cover 6*b* in such a manner as to be alternately engaged with the hub 71 and the cylindrical portion 6*b*' of the end cover 6*b*; and a piston 73 adapted to allow the friction plates 72, - - - , 72 to be placed in an engaged state.

The piston 73 is housed in a cylinder member 74 attached to a fitting portion between the transmission casing 6 and the cylindrical portion 6*b*' of the end cover 6*b*, and a radially outward oil chamber 75 and a radially inward oil chamber 76 are provided, respectively, on radially outward and inward sides in a space defined between the piston 73 and the cylinder member 74. Further, the transmission casing 6 and the cylinder member 74 are provided, respectively, with two oil passages 75a, 75b for supplying brake-engaging working oil to the respective oil pressure chambers 75, 76.

The third brake 80 comprises: a hub 81 integrally formed with the ring gear 34 of the third gear set 30; a plurality of friction plates 82, - - -, 82 disposed between the hub 81 and the inner peripheral surface of the cylindrical portion 6b' of the end cover 6b in such a manner as to be alternately engaged with the hub 81 and the cylindrical portion 6b' of the end cover 6b; and a piston 83 adapted to allow the friction plates 82, - - -, 82 to be placed in an engaged state. The end cover 6b is provided with an oil pressure chamber 84 adapted to move the piston 83 in an engagement direction in response to supply of working oil thereto, and an oil passage 84a for supplying working oil to the oil pressure chamber 84.

Further, the end cover 6b is provided with a lubricating oil passage 6b" for exclusively supplying lubricating oil to a bearing portion for the pinion 32 of the third gear set 30. This oil passage 6b" is communicated with an oil passage 33a provided in the carrier 33 of the third gear set 30, and an oil passage 35a provided in a pinion shaft 35, to supply lubricating oil to a bearing portion between the pinion shaft 35 and the pinion 32.

As above, although the first, second and third brake 60, 70, 80 are disposed between the end cover 6b, and the intermediate wall 6a of the transmission case 6 supporting the output gear 7, they are disposed on the radially outward side of the first, second and third gear sets 10, 20, 30. Thus, as compared with an arrangement where the first, second and third brakes 60, 70, 80 are disposed at axially offset positions from the first, second and third gear sets 10, 20, 30, an axial size of the speed change mechanism 5 or the entire automatic transmission can be reduced.

The first and second clutches 40, 50 are collectively disposed on the near side relative to the output gear 7 or the intermediate wall 6a of the transmission casing 6, and each of the first, second and third brakes 60, 70, 80 is disposed in block on the far side relative to the output gear 7 or the intermediate wall 6a of the transmission casing 6. This makes it possible to simplify a configuration of an oil passage for supplying working oil to the oil pressure chambers thereof.

Specifically, it is difficult to directly supply working oil from the transmission casing 6 to the first and second clutches 40, 50, and thereby the working oil has to be supplied from a central position where the input shaft 4 is disposed. Moreover, working oil for the first, second and third brakes 60, 70, 80 are supplied from the side of the transmission casing 6. If these oil supply lines mixedly exist in the transmission casing 6, the configuration of an oil passage will become complicated. In this embodiment, the first and second clutches 40, 50 and each of the first, second and third brakes 60, 70, 80 can be disposed collectively or in block to simplify the configuration of the oil passage.

In addition, the first and second clutches 40, 50 collectively disposed on the near side within the transmission casing 6 allows the oil passages 45a, 55a for supplying working oil to the oil pressure chambers 45, 55 to be provided in the oil pump cover 102 in a concentrated manner. This also contributes to simplification in the configuration of the oil passage.

The oil chamber of the second brake 70 is divided into the radially outward oil chamber 75 and the radially inward oil chamber 76, as described above. Thus, in an operation of placing the second brake 70 in the engaged state to establish the second and sixth speed stages, the engagement operation can be finely controlled by using either one of the oil chambers 75, 76. Further, after completion of the engagement operation, working oil can be supplied to both the oil chambers 75, 76 to ensure a required torque transmission capacity. This makes it possible to achieve an adequate speed change operation even for establishing either one of the second and sixth speed stages.

In the above speed change mechanism, during an operation of establishing the first speed stage, a rotation of the input shaft 4 is input into the sun gear 21 under a condition that the carrier 23 of the second gear set 20 is fixed by the carrier 23, as shown in FIG. 3, and thereby the ring gear 24 will be rotated in a reverse direction to that of the input shaft 4. Then, the reverse rotation is input into the carrier 33 of the third gear set 30. That is, in the third gear set 30, the rotation of the input shaft 4 is input into the sun gear 31, and the rotation having a reverse direction thereto is input into the carrier 33.

Consequently, the pinion 32 is rotated at a high speed in a non-power transmission state, and thereby the lubrication based on the lubricating oil passages 4b, 4c provided in the input shaft 4 causes a problem about lack of an amount of lubricating oil with respect to rotational speed.

In this embodiment, as shown in FIG. 11, lubricating oil is sufficiently supplied from the single-purpose lubricating oil passage 6b" provided in the end cover 6b, to the bearing portion for the pinion 32 of the third gear set 30. This makes it possible to avoid a problem that the pinion 32 is rotated at a high speed under the condition of insufficient lubrication.

As described above, the present invention provides an automatic transmission which comprises: a casing housing following components; an input shaft; an output member arranged on a same axis as that of the input shaft and at an intermediate position of the input shaft; first, second and third gear sets each formed as a single-pinion type planetary gear set including a sun gear, a pinion, a carrier and a ring gear, wherein the sun gear of the first gear set is continuously interconnected with the sun gear of the second gear set, the ring gear of the first gear set being continuously interconnected with the carrier of the second gear set, the ring gear of the second gear set being continuously interconnected with the carrier of the third gear set, the sun gear of the third gear set being continuously interconnected with the input shaft, and the carrier of the first gear set being continuously interconnected with the output member; a first clutch operable to selectively connect and disconnect the sun gear of the first gear set and the sun gear of the second gear set to/from the input shaft; a second clutch operable to selectively connect and disconnect the ring gear of the first gear set and the carrier of the second gear set to/from the input shaft; a first brake operable to selectively connect and disconnect the ring gear of the first gear set and the carrier of the second gear set to/from the casing; a second brake operable to selectively connect and disconnect the ring gear of the second gear set and the carrier of the third gear set to/from the casing; and a third brake operable to selectively connect and disconnect the ring gear of the third gear set to/from the casing. In the automatic transmission, the first clutch and the first brake are adapted to be placed in their engaged states so as to establish a first speed stage, and the first clutch and the second brake are adapted to be placed in their engaged states so as to establish a second speed stage. The first clutch and the third brake are adapted to be placed in their engaged states so as to establish a third speed stage, and the first clutch and the second clutch are adapted to be placed in their engaged states so as to establish a fourth speed stage. Further, the second clutch and the third brake are adapted to be placed in their engaged states so as to establish a fifth speed stage, and the second clutch and the second brake are adapted to be placed in their engaged states so as to establish a sixth speed stage.

In the above automatic transmission of the present invention, a forward 6-speed automatic transmission can be made up using only a single-pinion type planetary gear having a simple structure. This makes it possible to achieve an automatic transmission excellent in power transmission efficiency and silence, while facilitating reductions in overall size and cost of the automatic transmission, as compared with a conventional automatic transmission using a Ravigneaux type planetary gear set or a double-pinion type planetary gear set.

Preferably, in the automatic transmission of the present invention, when the input shaft is disposed to extend in a widthwise direction of a vehicle, and coupled to a driving source at one end thereof, the first, second and third gear sets are disposed on the input shaft in side-by-side relation, and the output member is disposed on a near side closer to the driving source, relative to one of the first, second and third gear sets which is disposed closest to the driving source.

According to this feature, the output member is disposed on the near side relative to one of the first, second and third gear sets which is disposed closest to the driving source, so that the output member is located adjacent to the driving source. This makes it possible to structurally simplify a power unit including the automatic transmission so as to provide enhanced layout flexibility during vehicle installation thereof.

The first gear set may be selected as the gear set disposed closest to the driving source.

Specifically, in a conventional transverse-mounted automatic transmission where an input shaft is arranged in a widthwise direction of a vehicle, a differential mechanism adapted to be driven by an output member through a counter drive mechanism is commonly arranged on a near side closer to a driving source, relative to a speed change mechanism, i.e., in a vicinity of a torque converter. Thus, according to the above arrangement, the output member comes close to the driving source, and a distance between the output member and the differential mechanism is also reduced. This makes it possible to downsize the counter drive mechanism, and structurally simplify a power unit to be formed by integrally coupling the automatic transmission and the differential mechanism together through the counter drive mechanism, so as to provide enhanced layout flexibility during vehicle installation thereof.

Preferably, in the above automatic transmission, the first and second clutches are disposed on one of a near side closer to the driving source and a far side opposite to the near side, relative to the output member, and the first, second and third brakes are disposed on a remaining one of the near and far sides relative to the output member.

According to this feature, a group of the first and second clutches, and a group of the first, second and third brakes are disposed separately on the near and far sides relative to the output member. This makes it possible to simplify the configuration of an oil passage for supplying working oil to the clutches and brakes.

The first and second clutches may be disposed on the near side closer to the driving source, relative to the output member, and the first, second and third brakes may be disposed on the far side opposite to the near side, relative to the output member.

In this case, the first and second clutches can be collectively disposed on the near side within the transmission casing to allow an oil passage for supplying working oil to an oil pressure chamber of each of the clutches to be provided in an oil pump cover in a concentrated manner. This contributes to simplification in the configuration of the oil passage.

Specifically, in general, working oil for a clutch is supplied from the side of a center of a speed change mechanism having an input shaft arranged therein, and working oil for a brake is supplied from the side of an outer periphery of the speed change mechanism. Thus, according to the above arrangement where the clutch group and the brake group are disposed separately on the near and far sides relative to the output member, each of an oil passage group led from the side of the center of the speed change mechanism and an oil passage group led from the side of the outer periphery of the speed change mechanism can be collectedly provided. This makes it passable to simplify a overall configuration of oil passages, as compared with a configuration where an oil passage from the side of the center of the speed change mechanism and an oil passage from the side of the outer periphery of the speed change mechanism mixedly exist.

Preferably, in the above automatic transmission, the first and second clutches are disposed at radially inward and outward positions in a superimposed manner.

According to this feature, the first and second clutches collectively disposed on the near or far side relative to the output member are disposed at radially inward and outward positions in a superimposed manner. This makes it possible to reduce an axial size of the speed change mechanism or automatic transmission, as compared with an arrangement where they are disposes side by side in the axial direction.

Preferably, in the above automatic transmission, when the first and second clutches are disposed on the near side relative to the output member, the casing includes a boss portion extending from a central region of a casing wall provided on a near side closer to the driving source, toward a far side opposite to the near side, relative to the first and second clutches, wherein the boss portion has an oil passage for supplying working oil to an oil pressure chamber of each of the first and second clutches.

According to this feature, when the first and second clutches are disposed on the near side relative to the output member, an oil passage for supplying working oil to an oil pressure chamber of each of the first and second clutches is provided in the boss portion extending from the central region of the casing wall provided on the near side toward the far side relative to the first and second clutches. This makes it possible to simplify the configuration of the oil passage led from the central region of the speed change mechanism to the oil pressure chamber of each of the clutches, as compared with a configuration where the oil passage is led from the input shaft. In this case, an oil pump cover generally attached between a torque converter-receiving portion and a speed change mechanism-receiving portion in the transmission casing may be used as the casing wall.

Preferably, in the above automatic transmission, the first, second and third brakes are disposed on the far side relative to the output member, and on a radially outward side relative to respective outer peripheries of the first, second and third gear sets.

According to this feature, as compared with an arrangement where the first, second and third brakes are disposed at axially offset positions from the corresponding first, second and third gear sets, an axial size of the speed change mechanism or the entire automatic transmission can be reduced.

Preferably, in the automatic transmission of the present invention, the second brake has an oil pressure chamber which comprises a radially inward oil pressure chamber and a radially outward oil pressure chamber.

According to this feature, the oil chamber of the second brake adapted to be placed in an engaged state during an operation of establishing second and sixth speed stages is divided into the radially outward oil chamber and the radially inward oil chamber. Thus, in an operation of placing the second brake in the engaged state to establish the second and sixth speed stages, the engagement operation can be finely controlled by using either one of the oil chambers. Further, after completion of the engagement operation, working oil can be supplied to both the oil chambers to ensure a required torque transmission capacity. This makes it possible to achieve an adequate speed change operation even for establishing either one of the second and sixth speed stages.

Preferably, the automatic transmission of the present invention comprises a lubricating oil passage for exclusively supplying lubricating oil to a bearing portion for the pinion of the third gear set.

According to this feature, lubricating oil can be sufficiently supplied from the single-purpose lubricating oil passage to the bearing portion for the pinion of the third gear set to be rotated particularly at a high speed in a given speed stage. This makes it possible to avoid a problem that the pinion is rotated at a high speed under a condition of insufficient lubrication.

INDUSTRIAL APPLICABILITY

As above, in the automatic transmission of the present invention, the speed change mechanism is made up using only a single-pinion type planetary gear set having a single structure. Thus, the present invention contributes to reductions in size and cost of an automatic transmission, and has a potential to be suitably used in the field of vehicle industries or vehicle transmission manufacturing industries.

This application is based on Japanese Patent Application Serial No. 2007-143058, filed in Japan Patent Office on May 30, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automatic transmission comprising:
a casing;
an input shaft provided inside said casing and connected to a driving source;
an output member arranged at a radially outward position on a same axis as an axis of said input shaft and at an intermediate position of said input shaft;
first, second and third gear sets each formed as a single-pinion type planetary gear set including a sun gear, a pinion, a carrier and a ring gear, said sun gear of said first gear set being continuously interconnected with said sun gear of said second gear set, said ring gear of said first gear set being continuously interconnected with said carrier of said second gear set, said ring gear of said second gear set being continuously interconnected with said carrier of said third gear set, said sun gear of said third gear set being continuously interconnected with said input shaft, said carrier of said first gear set being continuously interconnected with said output member;
a first clutch to selectively connect and disconnect said sun gear of said first gear set and said sun gear of said second gear set to and from said input shaft;
a second clutch to selectively connect and disconnect said ring gear of said first gear set and said carrier of said second gear set to and from said input shaft;
a first brake to selectively connect and disconnect said ring gear of said first gear set and said carrier of said second gear set to and from said casing;
a second brake to selectively connect and disconnect said ring gear of said second gear set and said carrier of said third gear set to and from said casing; and
a third brake to selectively connect and disconnect said ring gear of said third gear set to and from said casing,
wherein:
said first clutch and said first brake are respectively placed in engaged states to establish a first speed stage,
said first clutch and said second brake are respectively placed in engaged states to establish a second speed stage,
said first clutch and said third brake are respectively placed in engaged states to establish a third speed stage,
said first clutch and said second clutch are respectively placed in engaged states to establish a fourth speed stage,
said second clutch and said third brake are respectively placed in engaged states to establish a fifth speed stage,
said second clutch and said second brake are respectively placed in engaged states to establish a sixth speed stage,
said first, second, and third gear sets are disposed on said input shaft in a side by side relationship and said first and second clutches are disposed on said input shaft on a near side closer to said driving source, relative to said first, second and third gear sets, and
a diameter of a portion of said input shaft where said first, second, and third gear sets are disposed is smaller than a diameter of another portion of said input shaft where said first and second clutches are disposed.

2. The automatic transmission according to claim 1, wherein said input shaft is formed as a single member and said input shaft has opposite ends respectively supported by the end wall portions of said casing.

3. The automatic transmission according to claim 2, wherein said casing has an intermediate wall through which said input shaft extends, said output member is disposed on a driving source side of the first gear set, and said output member is supported by said intermediate wall through a bearing.

4. The automatic transmission according to claim 3, wherein said first, second, and third gear sets are disposed side by side in the order of said first, second, and third gear sets on an opposite side of the driving source, relative to the intermediate wall.

5. The automatic transmission according to claim 4, wherein said first and second clutches are disposed on a side of the driving source relative to the output member, and said first, second, and third brakes are disposed on a far side relative to the driving source, relative to said intermediate wall.

6. The automatic transmission according to claim 5, wherein said first clutch is superimposed radially outwardly over said second clutch.

7. The automatic transmission according to claim 5, wherein said casing includes a boss portion extending from a central region of a casing wall provided on a near side thereof closer to the driving source, toward a far side opposite to the near side, said boss portion having an oil passage and each of said first and second clutches having an oil pressure chamber, said oil passage to supply working oil to the oil pressure chamber of each of said first and second clutches.

8. The automatic transmission according to claim 5, wherein said first, second, and third brakes are disposed on said far side relative to the driving source, and said first, second, and third brakes are disposed radially on an outward side relative to respective outer peripheries of said first, second, and third gear sets.

9. An automatic transmission comprising:

a casing;

an input shaft provided in side said casing and connected to a driving source;

an output member arranged at a radially outward position on a same axis as an axis of said input shaft and at an intermediate position of said input shaft;

first, second and third gear sets each formed as a single-pinion type planetary gear set including a sun gear, a pinion, a carrier and a ring gear, said sun gear of said first gear set being continuously interconnected with said sun gear of said second gear set, said ring gear of said first gear set being continuously interconnected with said carrier of said second gear set, said ring gear of said second gear set being continuously interconnected with said carrier of said third ring gear set, said sun gear of said third gear set being continuously interconnected with said input shaft, said carrier of said first gear set being continuously interconnected with said output member;

a first clutch to selectively connect and disconnect said sun gear of said first gear set and said sun gear of said second gear set to and from said input shaft;

a second clutch to selectively connect and disconnect said ring gear of said first gear set and said carrier of said second gear set to and from said input shaft;

a first brake to selectively connect and disconnect said ring gear of said first gear set and said carrier of said second gear set to and from said casing;

a second brake to selectively connect and disconnect said ring gear of said second gear set and said carrier of said third gear set to and from said casing;

a third brake to selectively connect and disconnect said ring gear of said third gear set to and from said casing; and a one-way clutch provided in said casing between said ring gear of the first gear set and the carrier of the second gear set;

wherein:

said first clutch is placed in engaged state to establish a first speed stage, or said first clutch and said first brake are respectively placed in engaged states to establish a first speed stage, said first clutch and said second brake are respectively placed in engaged states to establish a second speed stage, said first clutch and said third brake are respectively placed in engaged states to establish a third speed stage, said first clutch and said first brake are respectively placed in engaged states to establish a fourth speed stage, said second clutch and said third clutch are respectively placed in engaged states to establish a fifth speed stage, said second clutch and said second brake are respectively placed in engaged states to establish a sixth speed stage, said first, second, and third gear sets are disposed on said input shaft in a side by side relationship and said first and second clutched are disposed on said input shaft on a near side closer to said driving source, relative to said first, second and third gear sets, and a diameter of the portion of said input shaft where said first, second, and third gear sets are disposed is smaller than a diameter of another portion of said input shaft where said first and second clutches are disposed.

* * * * *